United States Patent [19]

Bonacci et al.

[11] 4,238,468
[45] Dec. 9, 1980

[54] AMMONIA MANUFACTURING PROCESS

[75] Inventors: John C. Bonacci, Murray Hill; Thomas G. Otchy, Fanwood; Thomas Ackerman, Teaneck, all of N.J.

[73] Assignee: Engelhard Minerals and Chemicals Corporation, Iselin, N.J.

[21] Appl. No.: 938,187

[22] Filed: Aug. 30, 1978

[51] Int. Cl.³ .............................................. C01C 1/04
[52] U.S. Cl. .................................... 423/359; 423/362
[58] Field of Search ............................... 423/359–363, 423/247; 252/373–376

[56] References Cited

U.S. PATENT DOCUMENTS 3,088,919  5/1963  Brown, Jr. et al. ................. 423/247
3,132,010  5/1964  Dwyer et al. ........................ 252/372

OTHER PUBLICATIONS

Brown, Jr. et al., Purifying H₂ by Selective Oxidation of CO, I & EC, vol. 52, pp. 841–844, 10/60.
Andersen, Removing CO from NH₃ Synthesis Gas, I & EC, vol. 53, No. 8, pp. 645–646, 8/61.
Quartulli, Check List for High Pressure Reforming Hydrocarbon Processing, vol. 44, No. 4, pp. 151–162, 4/65.
Bressler et al., Q & A on Today's NH₃ Plants, Chem. Eng., pp. 109–118, 6/65.

Primary Examiner—Wayne A. Langel

[57] ABSTRACT

In an ammonia manufacturing operation a normally gaseous hydrocarbon or a vaporized naphtha is steam reformed and shift converted, in the presence of air to produce a relatively hot water vapor-containing gaseous stream containing nitrogen and hydrogen in substantially stoichiometric proportion for the production of ammonia along with carbon dioxide and with minor amounts of carbon monoxide. The hot gaseous mixture is then cooled to remove water vapor therefrom as water, and oxygen, usually in the form of air, is added to the resulting cooled gaseous mixture which is contacted with a catalyst for the selective oxidation of the carbon monoxide therein to carbon dioxide in the presence of hydrogen. The oxygen is provided in part by air diverted from the steam reforming and in part by supplemental air. The resulting gases, now having a substantially reduced carbon monoxide content, are then treated for the removal of carbon dioxide and optionally to methanation to convert residual carbon oxides therein to methane.

The resulting treated gases are subjected to contact with a catalyst under high pressure and at an elevated temperature for the conversion of the nitrogen and hydrogen in the treated gases to ammonia.

21 Claims, 9 Drawing Figures

INCREASE IN AMMONIA PRODUCTION WITH CO SELECTIVE OXIDATION VS CONCENTRATION EXIT LTSC

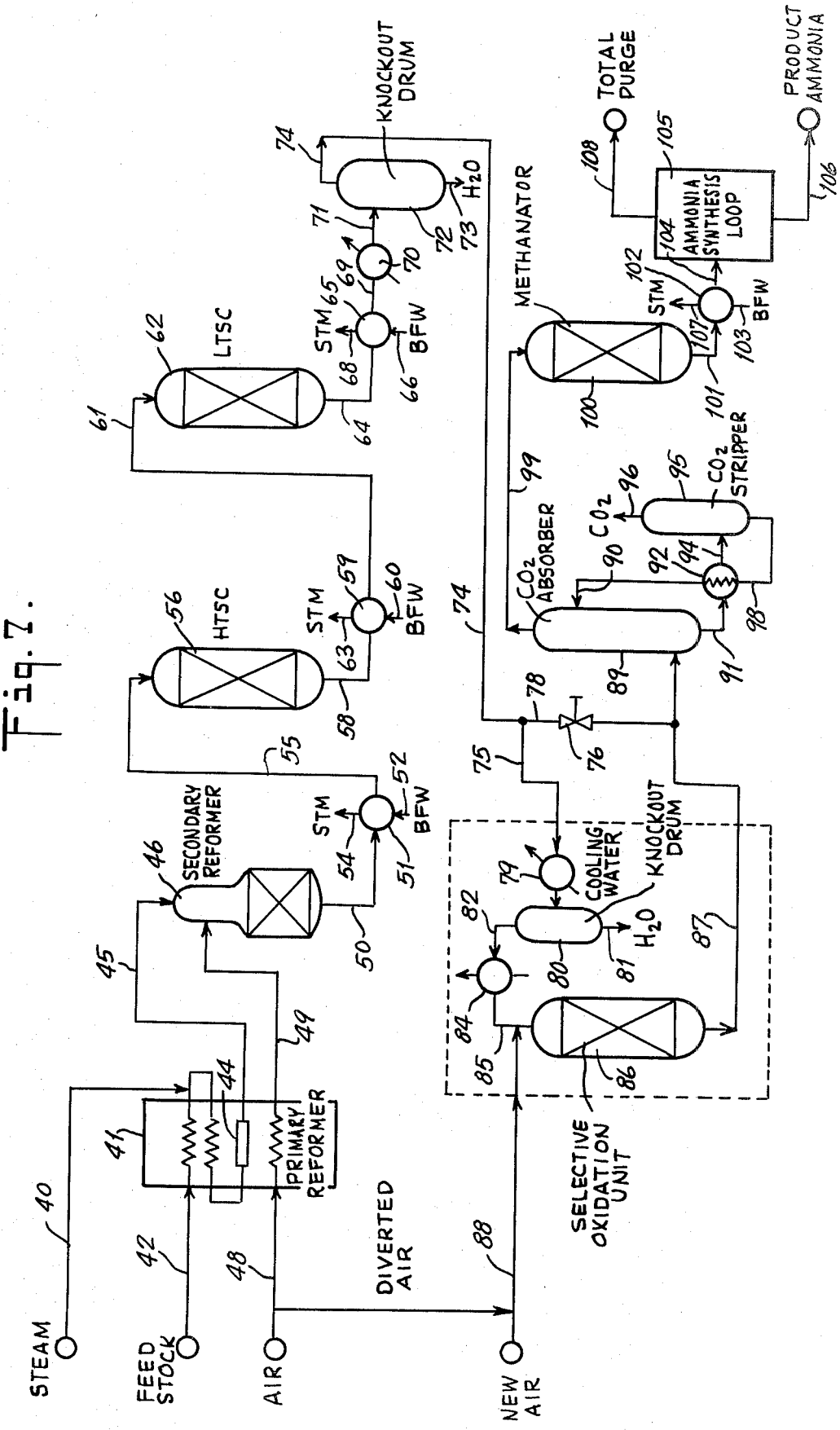

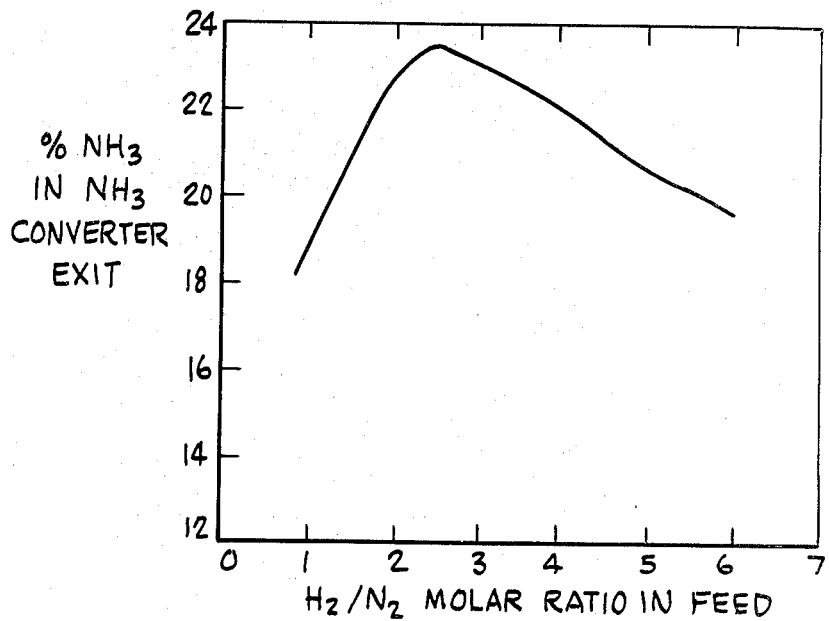
Fig. 8. EFFECT OF H/N RATIO ON $NH_3$ YIELD
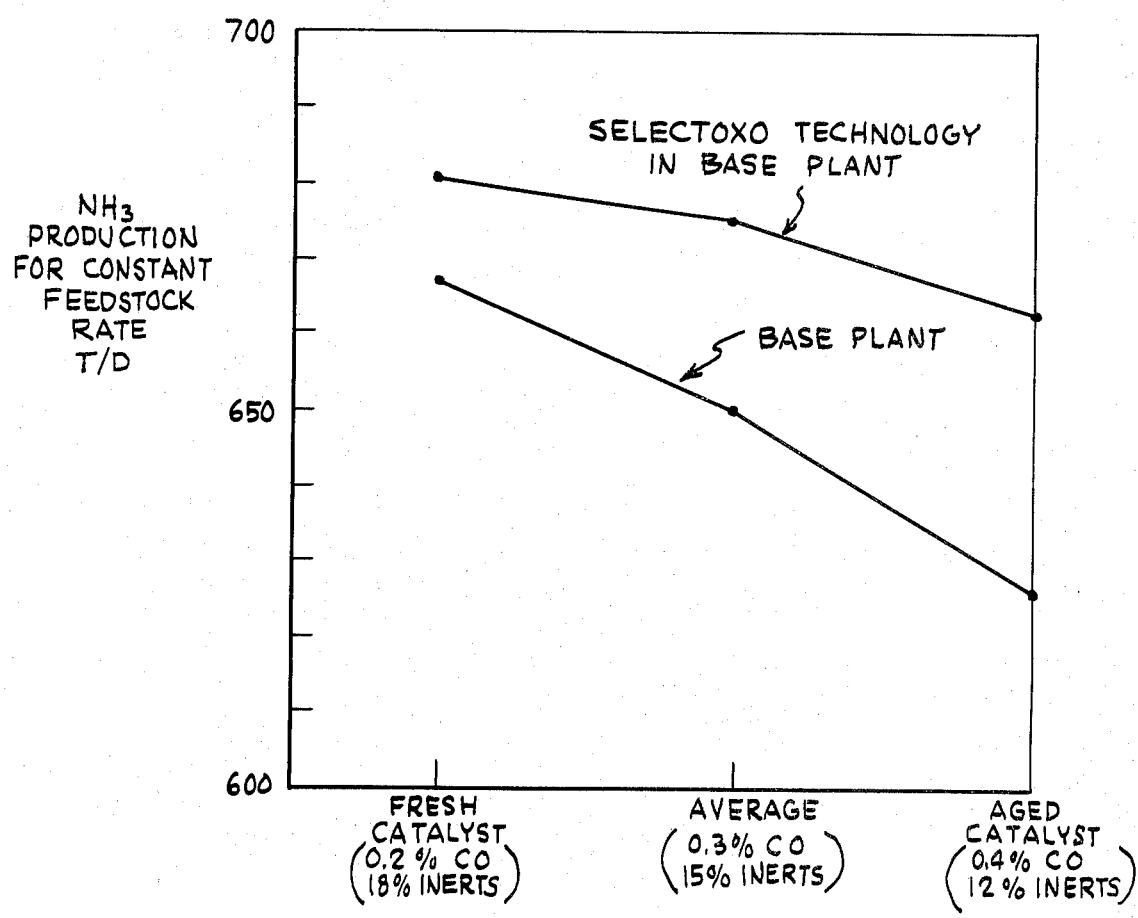
Fig. 9. PRODUCTION RATE AS LOW TEMP. SHIFT CATALYST AND $NH_3$ SYNTHESIS CATALYST AGE

AMMONIA MANUFACTURING PROCESS

This invention relates to an improved process for the manufacture of ammonia. More particularly, this invention relates to an improved process for the manufacture of ammonia from a synthesis gas comprising substantially only nitrogen and hydrogen in about the stoichiometric amount for the production of ammonia therefrom.

Still more particularly, this invention relates to an improved process for the production of a synthesis gas comprising substantially only nitrogen and hydrogen in the molar ratio of about 1:3 suitable for the manufacture of ammonia therefrom, the synthesis gas having been prepared by subjecting a normally gaseous hydrocarbon, such as methane, or a vaporized petroleum fraction, such as a naphtha fraction, to operations including steam reforming and shift conversion, the shift conversion preferably being carried out in two stages. In the steam reforming and shift conversion operations, in addition to the normally gaseous hydrocarbon or vaporized light petroleum fraction, there is also employed steam and air with the resulting production of a hot gaseous stream containing nitrogen and hydrogen in substantially stoichiometric amount for the production of ammonia along with carbon oxides, i.e., carbon monoxide and carbon dioxide. Heretofore, in the production of ammonia synthesis gas involving steam reforming and shift conversion of hydrocarbons, it has been the practice to remove the carbon dioxide from the gases resulting from the steam reforming and shift conversion operations and then to subject the resulting substantially carbon dioxidefree gases to methanation wherein remaining carbon oxides, particularly carbon monoxide, present in the gases are converted to methane. The resulting gases, now consisting essentially only of nitrogen and hydrogen with a small amount of methane, would then be passed to the catalytic converter for the production of ammonia from the nitrogen and hydrogen. Gases from the ammonia synthesis reactor would be recycled through the catalytic converter for ammonia production and a certain portion of this gas would be continuously purged. As such gases are purged there is a loss of not only some valuable ammonia but also valuable synthesis gas comprising essentially nitrogen and hydrogen. Additionally, in such an operation the methanation of the carbon oxides, particularly carbon monoxide, in the nitrogen and hydrogen synthesis gas to inert methane results in the conversion of hydrogen to additional methane which must also be purged, thereby further reducing the efficiency and productivity of the overall operation.

As indicated hereinabove, processes for the production of ammonia from a synthesis gas derived by the steam reforming and shift conversion of a gaseous hydrocarbon, such as methane and natural gas, are well developed, see particularly the article entitled "Check List for High Pressure Reforming" by Quartulli, *Hydrocarbon Processing*, pages 151-162, April 1965, the article entitled "Questions and Answers on Today's Ammonia Plants" by Bressler and James, *Chemical Engineering*, pages 109-118, June 1965 and U.S. Pat. No. 3,132,010, the disclosures of each of which are incorporated by reference herein and made part of this disclosure. In the above-referred publications, particularly the Quartulli article, there are disclosed and illustrated ammonia plants wherein ammonia synthesis gas (nitrogen and hydrogen) derived by the steam reforming and shift conversion of natural gas is produced, the produced ammonia synthesis gas consisting essentially of nitrogen and hydrogen saturated with water vapor and containing also carbon monoxide and carbon dioxide. The carbon dioxide is removed by a carbon dioxide absorber and the resulting carbon dioxide-stripped synthesis gas then subjected to methanation for the substantial complete conversion of the carbon oxides therein, carbon monoxide and residual carbon dioxide, to inert methane before the thus-treated ammonia synthesis gas, now comprising substantially only nitrogen and hydrogen with some methane, is passed to the catalytic converter for the conversion of nitrogen and hydrogen in the synthesis gas to ammonia.

In the operations referred to hereinabove, carbon monoxide in the synthesis gas is removed by methanation wherein carbon monoxide is catalytically reacted with hydrogen to produce inert methane. It is necessary to remove carbon monoxide from the ammonia synthesis gas before the ammonia synthesis gas goes to the catalytic converter for the production of ammonia since carbon monoxide acts as a catalyst poison in the ammonia catalytic converter. It is known, however, to catalytically selectively oxidize carbon monoxide to carbon dioxide in the presence of hydrogen. By selective oxidation of carbon monoxide is meant the reaction of the carbon monoxide with oxygen to form carbon dioxide even in the presence of large or major amounts of hydrogen with minimum oxidation of hydrogen. During the selective oxidation of carbon monoxide present in an ammonia synthesis gas which contains, in addition to nitrogen, a substantial or major amount of hydrogen, the oxidation of hydrogen during the selective oxidation of carbon monoxide is to be minimized since the hydrogen in the ammonia synthesis gas was produced for the intended purpose of being catalytically reacted with nitrogen in the synthesis gas to produce ammonia. Ideally, the selective oxidation of carbon monoxide present in ammonia synthesis gas should be carried out such that only the carbon monoxide in the ammonia synthesis gas is oxidized.

U.S. Pat. Nos. 3,088,919, 3,216,782 and 3,216,783 and Canadian Pat. No. 828,058 disclose processes for the catalytic selective oxidation of carbon monoxide, such as selective oxidation processes employing precious metal catalysts, e.g. a platinum-containing catalyst, a ruthenium-containing catalyst and a rhenium-containing catalyst. In these patents the operating temperature for the catalytic selective oxidation of carbon monoxide is disclosed to be in the range about 100°-200° C. Additionally, U.S. Pat. No. 3,631,073 describes a process for the selective catalytic oxidation of carbon monoxide at a relatively low temperature in the range 20°-100° C., the molar ratio of oxygen to carbon monoxide in the carbon monoxide-containing gaseous mixture being treated being in the range 0.5:1 to about 3:1.

Also, U.S. patent application Ser. No. 509,192, assigned to the assignee of this application, filed Nov. 22, 1965, now abandoned, disclosed a platinum-containing catalyst having improved selectively or operability for the selective oxidation of carbon monoxide in gaseous mixtures containing hydrogen, nitrogen and carbon monoxide. The platinum catalyst disclosed in the above-identified patent application permitted the selective oxidation of carbon monoxide in the presence of hydrogen at temperatures lower than have previously been possible. Additionally, it is mentioned that U.S. Pat. No.

3,631,073 is directed to resolving the serious problem of catalyst deterioration with respect to the use of precious metal catalysts for the selective oxidation of carbon monoxide at relatively low temperatures, specifically the problem of deactivation of such catalysts after a relatively brief period of time when employed in the selective oxidation of carbon monoxide. Also, coassigned U.S. patent application Ser. No. 730,302 filed Oct. 7, 1976 and its coassigned continuation-in-part application Ser. No. 832,313 filed Sept. 12, 1977 disclose improvements with respect to the process for the selective oxidation of carbon monoxide in the presence of hydrogen, such as ammonia synthesis gases derived from the steam reforming and shift conversion of a normally gaseous hydrocarbon and containing nitrogen and hydrogen in substantially stoichiometric amount for the production of ammonia and minor amounts of oxygen, carbon monoxide, carbon dioxide and water vapor, the improvements including reducing the water vapor content of such gases below saturation, i.e. to a relative humidity below 100%, prior to contacting such gases with a catalyst, such as a platinum containing catalyst, for the selective oxidation of carbon monoxide therein to carbon dioxide. The disclosures of the above-identified U.S. patents and U.S. patent applications are herein incorporated and made part of this disclosure.

In accordance with the present invention, there is provided a process for the selective oxidation of carbon monoxide present in a gaseous mixture obtained by steam reforming a normally gaseous hydrocarbon or vaporized naphtha in a steam reforming reaction zone into which a gaseous stream containing oxygen, i.e., air, is normally introduced at a preselected rate, and shift converting the reforming reaction zone effluent. The gaseous mixture being at an elevated temperature substantially above about 200° C., say at about 250° to 950° C., and containing hydrogen and nitrogen in approximately stoichiometric proportion for the production of ammonia. The process comprises cooling the gaseous mixture to a temperature in the range from about 20° C. to about 200° C. to condense water vapor therefrom and removing resulting condensed water from the cooled gaseous mixture. The cooled gaseous mixture is introduced into a selective oxidation reaction zone containing a catalyst effective for the selective oxidation of carbon monoxide to carbon dioxide in the presence of hydrogen. A minor portion of said gaseous stream containing oxygen, i.e., air, which conventionally is introduced into the steam reforming reaction zone, is diverted into said selective oxidation reaction zone, thereby reducing the rate of oxygen introduced into the steam reforming zone to less than the normally preselected rate and providing diverted oxygen to the selective oxidation reaction zone. Supplemental oxygen is introduced into the selective oxidation reaction zone, the diverted and supplemental oxygen oxidizing therein carbon monoxide to carbon dioxide in contact with the selective oxidation catalyst. The resulting treated gaseous mixture is withdrawn from the selective oxidation reaction zone which now has a reduced carbon monoxide content and comprises nitrogen and hydrogen and carbon dioxide. The gaseous mixture withdrawn from the selective oxidation reaction zone is subjected to treatment for the selective removal of carbon dioxide therefrom and the thus treated gaseous mixture, which now has a reduced carbon monoxide and carbon dioxide content and comprises nitrogen and hydrogen is passed into an ammonia conversion zone to contact therein a catalyst effective for the conversion of the gaseous nitrogen and hydrogen to ammonia.

In accordance with another aspect of the invention, the sum of diverted air and supplemental oxygen introduced into the selective oxidation reaction zone is such as to provide from about one-half to about all of the stoichiometric amount of oxygen required to convert all the carbon monoxide in the selective oxidation reaction zone to carbon dioxide. It is at least the stoichiometric amount, in one aspect of the invention.

In another aspect of the invention the supplemental oxygen is provided by introducing an air stream into the selective oxidation reaction zone. The air introduced into the steam reforming reaction zone and the air stream introduced into the selective oxidation reaction zone may conveniently be provided from a common source.

Certain advantages of the invention are attained when the diverted oxygen provides from about 40-60% of the oxygen introduced into the selective oxidation reaction zone, the supplemental oxygen provides from about 60-40% of the oxygen introduced into the selective oxidation zone and the diverted and supplemental oxygen together amount to at least about 50%, up to about 100% of the stoichiometric amount of oxygen required to oxidize the carbon monoxide to carbon dioxide in the selective oxidation reaction zone. At least about 50% of the stoichiometric amount of oxygen may be provided by either the supplemental or diverted oxygen.

It is an object of this invention to provide an improved process for the manufacture of ammonia from an ammonia synthesis gas consisting essentially only of nitrogen and hydrogen.

It is another object of this invention to provide an improved process for the manufacture of ammonia from an ammonia synthesis gas produced from normally gaseous hydrocarbon or a vaporized light petroleum fraction, such as a naphtha fraction, by operations involving steam reforming and shift conversion.

Still another object of this invention is to provide a process for the manufacture of ammonia from a synthesis gas comprising essentially only nitrogen and hydrogen and derived from the steam reforming and shift conversion of a normally gaseous hydrocarbon or a vaporized hydrocarbon such that the requirement of a methanator for the removal of any carbon monoxide in such synthesis gas is reduced or eliminated due to the fact that the synthesis gas thus produced in accordance with the practices of this invention contains less or is essentially free of carbon monoxide, a well known and notorious catalyst poison for the catalyst employed for the catalytic conversion of nitrogen and hydrogen to ammonia.

Yet another object of this invention is to provide an improved process for the manufacture of ammonia involving steam reforming and shift conversion of hydrocarbons, the process having increased productivity and utilization of the produced hydrogen.

How these and other objects of this invention are achieved will become apparent in the light of the accompanying disclosure made with reference to the accompanying drawings wherein.

Figure 5:
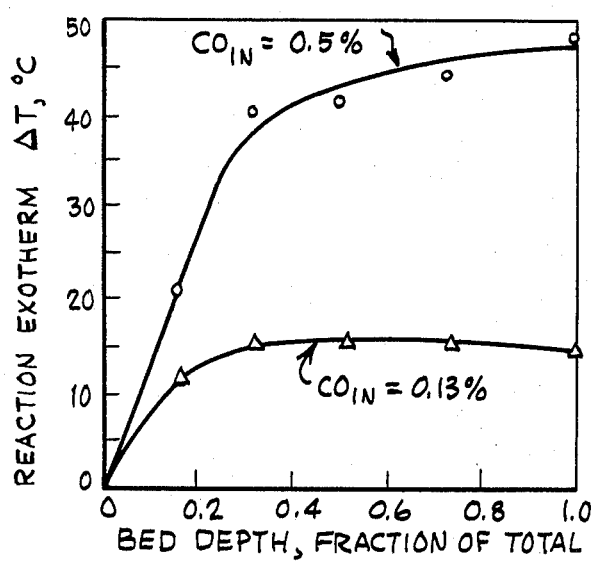
Figure 6:
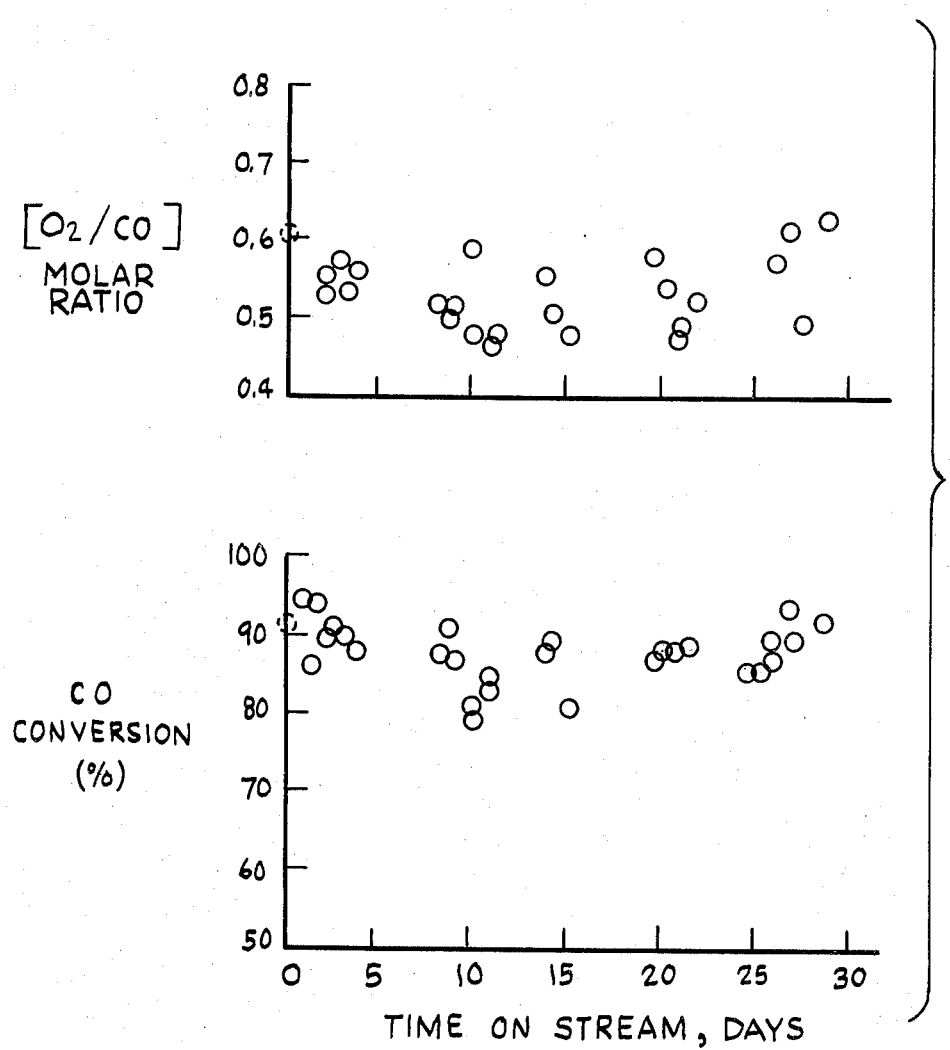

FIG. 5 graphically shows actual plant reaction exotherms in a demonstration catalytic unit for the selective oxidation of carbon monoxide to carbon dioxide showing the influence of inlet carbon monoxide concentration on the reaction isotherm;

FIG. 6 graphically illustrates the selective oxidation of carbon monoxide to carbon dioxide with time and oxygen/carbon monoxide ratios in the feed to the selective oxidation unit over the same time period;

FIG. 7 is a flow scheme embodying a practice of this invention for the manufacture of ammonia from synthesis gas derived by steam reforming and shift conversion of a gaseous hydrocarbon;

FIG. 8 graphically illustrates the well-known effect of hydrogen to nitrogen ratio on ammonia yield involving the catalytic reaction of hydrogen and nitrogen to produce ammonia; and FIG. 9 graphically illustrates the increased yield or production of ammonia in accordance with the practices of this invention over conventional or base plant technology.

As indicated hereinabove, it is known to employ selective oxidation catalysts for the selective oxidation of carbon monoxide in ammonia synthesis gas streams. However, heretofore, none of the techniques available gave full realization of the benefits possible in an ammonia manufacturing plant and realizable in the practices of this invention wherein an ammonia synthesis gas comprising essentially nitrogen and hydrogen and containing some carbon monoxide is treated so as to selectively oxidize the carbon monoxide present therein to carbon dioxide which would then be removed prior to subjecting the resulting treated ammonia synthesis gas to catalytic reaction for the production of ammonia. The benefits in the practices of this invention involving the selective oxidation of carbon monoxide in an ammonia synthesis gas are obtained by providing air to the catalytic unit for the selective oxidation of carbon monoxide in the ammonia synthesis gas from a mixture of partially diverted secondary reformer air and/or new air. New air may be introduced in addition to the amount used in a plant not using selective oxidation of carbon monoxide. Also involved in some of the embodiments of the practices of this invention is the adjustment of the primary reformer temperature and alteration of the hydrogen to nitrogen ratio in the fresh feed to the ammonia systhesis loop, i.e. the ammonia catalytic converter, and in the total feed to the ammonia synthesis loop. In the practices of this invention, as embodied in a single train ammonia synthesis plant, there is included therein a unit for the selective oxidation of carbon monoxide to carbon dioxide such that the process feed gas containing carbon monoxide to the selective oxidation unit receives minimal feed preparation, including temperature and composition adjustment. The operation of the selective oxidation unit in the embodiment of this invention is adjusted and carried out such that interactions with other process steps in a single train ammonia plant employing an ammonia synthesis gas derived from the steam reforming and shift conversion of a normally gaseous hydrocarbon, e.g. methane, or a vaporized petroleum fraction, e.g. naphtha, are optimized as a consequence of the performance of the selective oxidation unit operated in accordance with the practices of this invention. In one preferred embodiment of the practices of this invention applicable to a single train ammonia synthesis plant, the selective oxidation of carbon monoxide is carried out employing a platinum metal catalyst and at a fairly low temperature, e.g. in the range 20°–100° C. Desirably, the moisture content of the carbon monoxide-containing synthesis gas to be treated for the selective oxidation of carbon monoxide therein, is below saturation. Also, desirably, in the practices of this invention the selective oxidation unit is located between the second stage or low temperature shift converter exit and the carbon dioxide absorber inlet. Desirably, also, the process parameters are adjusted, as mentioned hereinabove, to optimize interaction with the other process steps or operations such as the primary reformer, secondary reformer and ammonia synthesis converter. A synergistic effect is obtained in that by appropriate selection of the amount of diverted and/or new air sent to the selective oxidation step, other critical factors such as the nitrogen to hydrogen ratio to the synthesis loop may be adjusted as desired, a step not readily heretofore attainable in ammonia plants.

How the practices of this invention are carried out and how the advantages obtainable from the practices of this invention are realizable will become apparent with reference to the accompanying drawings.

Figure 1:
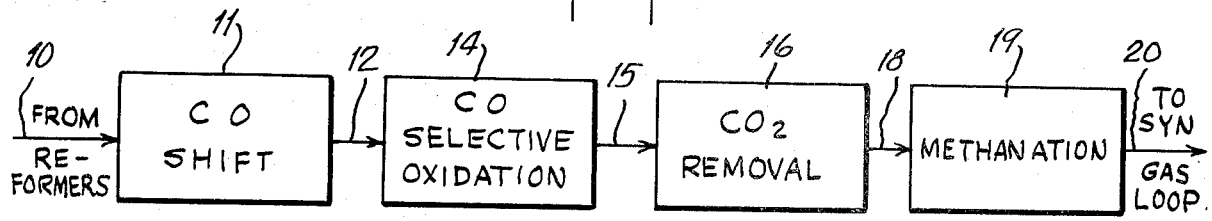
FIG. 1 is a flow chart showing some of the important operational steps in treating synthesis gas including selective oxidation of carbon monoxide in accordance with an embodiment of the practices of this invention.

Referring now to FIG. 1, there is schematically illustrated therein a flow scheme wherein there is obtained a gaseous stream by steam reforming of a normally gaseous hydrocarbon, which steam reforming operation is advantageously carried out in a primary reformer, followed by a secondary reformer, the steam reforming operations employing, in addition to a normally gaseous hydrocarbon, air and steam. There issues from the reformers an ammonia synthesis gas stream comprising nitrogen and hydrogen in substantially stoichiometric amount for the manufacture of ammonia together with minor amounts of steam, carbon monoxide and carbon dioxide. Still referring to FIG. 1, the ammonia synthesis gaseous stream from the reformers is supplied via line 10 to shift converter 11, preferably a dual stage shift conversion operation employing a high temperature shift conversion and a low temperature shift conversion. The reactions essentially involved in the steam reforming and shift conversion operations for the production of hydrogen from a gaseous hydrocarbon, such as methane, is indicated in the accompanying chemical reactions:

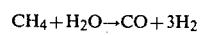

$$CH_4 + H_2O \rightarrow CO + 3H_2$$

$$CO + H_2O \rightleftharpoons CO_2 + H_2$$

After the combination of steam reforming and shift conversion operations are carried out, as indicated hereinabove, in the presence of steam and air, the resulting gaseous stream is supplied via line 12 to catalytic unit 14, such as a selective oxidation unit, for the selective oxidation of carbon monoxide present in the stream to carbon dioxide. The resulting catalytically treated gaseous stream, now having a reduced carbon monoxide content and an increased carbon dioxide content, is supplied via line 15 to carbon dioxide absorber 16 for the removal of carbon dioxide. The resulting gaseous stream, now substantially free of carbon dioxide, is supplied via line 18 to methanator 19 for the conversion of residual carbon oxides, particularly carbon monoxide, to methane. The residual carbon oxides to be converted to methane are present in quantities much lower than those usually obtained in plants not using the selective oxidation step. Thereupon, the resulting ammonia synthesis gas, now substantially free of carbon monoxide, is supplied via line 20, to the catalytic ammonia conversion unit or synthesis gas loop for the production of ammonia.

Figure 2:
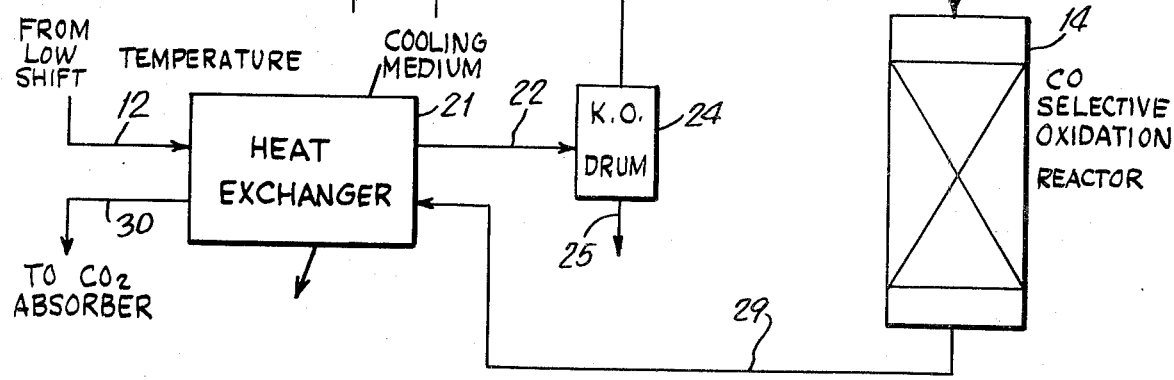
FIG. 2 is a flow chart indicating the selective oxidation of carbon monoxide from hot gases produced in accordance with a preferred embodiment of the practices of this invention.

Referring now to FIG. 2 of the drawings, there is illustrated therein in greater detail or more specifically the operation in accordance with the practices of this invention which includes the selective oxidation of carbon monoxide in the ammonia synthesis gas. As illustrated in FIG. 2, employing, where appropriate or suitable, the same reference numerals employed in connection with the same elements employed in connection with FIG. 1, carbon monoxide containing ammonia synthesis gas from a low temperature shift converter is supplied via line 12 to cooling heat exchanger 21 from which the resulting cooled synthesis gas leaves via line 22 to knockout drum or water collector 24. Water is condensed from the synthesis gas as it is cooled upon passage through cooling heat exchanger 21. The condensed water is collected in and removed from knockout drum 24. The resulting cooled gases, now having a substantially reduced water content, such as being substantially saturated with water vapor, leave knockout drum 24 via line 26. Air from a suitable outside source is supplied via line 28 to the relatively cool gases passing via line 26 into carbon monoxide selective oxidation unit or reactor 14. The addition of air in addition to providing the required oxygen necessary to oxidation via line 28 to the cooled, substantially water-saturated gases moving through line 26 to selective oxidation unit 14, serves to reduce the water vapor partial pressure of the gases below saturation, i.e. below 100% relative humidity. Selective oxidation unit 14 is provided with a precious metal catalyst, such as a platinum-containing catalyst, and is operated at a temperature in the range 20°–100° C. effective for the substantially complete oxidation of carbon monoxide in the gas stream moving through selective oxidation unit 14. There issues from selective oxidation unit 14 via line 29 a gaseous stream having a substantially reduced carbon monoxide content as compared with the carbon monoxide present in the gas stream moving via line 26 into selective oxidation unit 14. The resulting catalytically treated gases leaving selective oxidation unit 14 via line 29 are passed through cooling heat exchanger 21 for further cooling before being supplied via line 30 to the carbon dioxide absorber unit, not shown.

Figure 3:
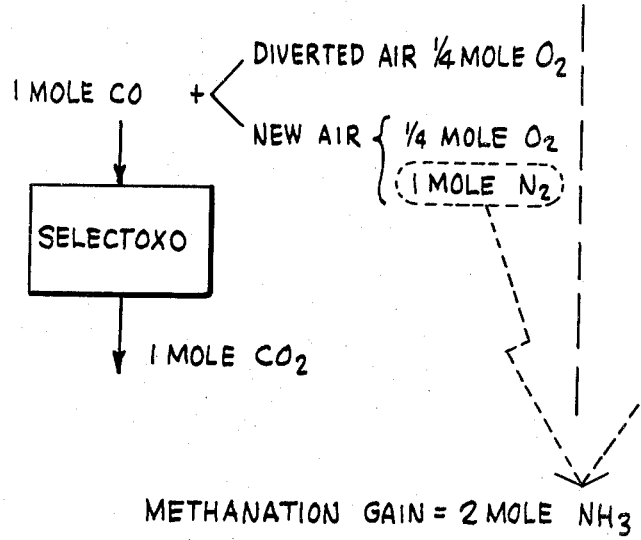
FIG. 3 is a comparative schematic presentation of how the advantages of the practices of this invention identified therein as selective oxidation are obtained relative to the prior art identified therein as Conventional Technology.
Figure 3:
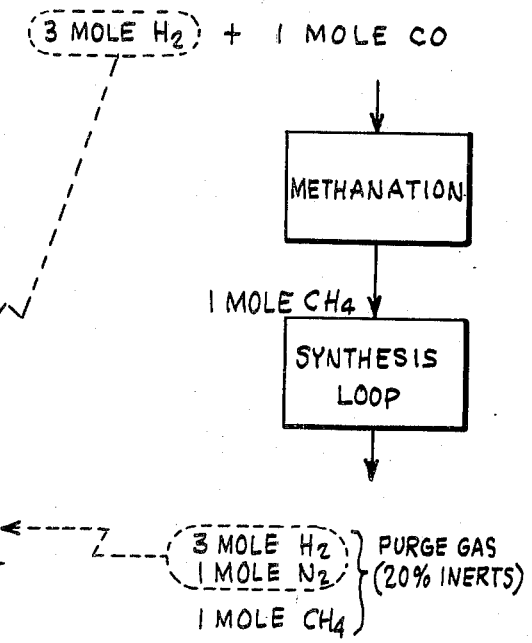

Referring now to FIG. 3 of the drawings, there are indicated therein the advantages and benefits, particularly with respect to ammonia productivity, when the practices in accordance with this invention are carried out in an ammonia manufacturing plant. More particularly, the benefits obtainable with respect to increased productivity by incorporating the practices of this invention, identified in FIG. 3, as selective oxidation, in an ammonia manufacturing plant are illustrated relative to the conventional operation of an ammonia manufacturing plant, identified as Conventional Technology, which employs a methanator for the removal of carbon monoxide from the ammonia synthesis gas prior to passing the synthesis gas to the ammonia synthesis unit or loop, there being no provision made for the separation of the carbon monoxide from the ammonia synthesis gas other than conversion of the carbon monoxide to methane in the methanator.

In the operation of an ammonia manufacturing plant employing a methanator, there being no provision for the selective oxidation of carbon monoxide to carbon dioxide, for every mole of carbon monoxide treated in the methanator for conversion to methane, with the resulting gases then passed to the ammonia synthesis unit or loop, 3 mols of hydrogen would be consumed for every mole of carbon monoxide treated in the methanator as indicated by the chemical reaction:

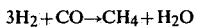

$$3H_2 + CO \rightarrow CH_4 + H_2O$$

Moreover, since methane is inert in the ammonia synthesis operation, with continued conversion of carbon monoxide to methane and introduction of the thus-produced methane into the ammonia synthesis loop, the concentration of inert methane in the ammonia synthesis loop would increase until eventually the ammonia synthesis gases would have to be purged from the ammonia synthesis loop. Assuming purging would take place when the inert (methane) concentration in the ammonia synthesis gas is the ammonia synthesis loop or converter reaches 20%, for every mole of methane thus removed in the purged gas there would also be removed substantially 3 moles of hydrogen and 1 mole of nitrogen, the equivalent of 2 moles of ammonia.

It is thus seen in Conventional Technology, for every mole of carbon monoxie converted to methane, there would be consumed or wasted 6 moles of hydrogen, 3 moles going to CH₄ production and 3 moles lost to gas purging, and 1 mole of nitrogen wasted to gas purging on the assumption the purge gas taken from the ammonia synthesis loop contains 20% inerts (methane).

On the other hand, in an ammonia synthesis plant employing the practices of this invention for the selective oxidation of carbon monoxide to carbon dioxide, for every mole of carbon monoxide selectively oxidized to carbon dioxide one-half a mole of oxygen would be consumed, say, 50% of which could be obtained from air diverted from the reformers and 50% of which could be air newly added to the selective oxidation unit. The added air would further provide about two moles of nitrogen. One mole of this nitrogen would be consumed by reaction to ammonia with 3 moles of hydrogen produced additionally in the reformer due to the reduced amount of secondary air, and attending increased hydrogen production in the reformer and shift reactor. The other mole of nitrogen issuing from the selective oxidation of carbon monoxide is available for reaction to ammonia with three moles of hydrogen which otherwise would have to be consumed by the methanation of carbon monoxide. This fact is illustrated by the scheme of FIG. 3.

Proportions of diverted and new air other than the 50%—50% ratio mentioned above may be employed. By varying the proportions great flexibility is attained in operating other portions of the ammonia plant. Accordingly, by selectively oxidizing the carbon monoxide to carbon dioxide, rather than converting the carbon monoxide to methane, there is made available an additional amount of synthesis gas for the production of 2 moles of ammonia. This gain in synthesis gas would be reflected in increased ammonia production. Further, coupled with the fact that an equivalent amount of ammonia synthesis gas would not be lost by purging, the amount being, as indicated, equivalent to 2 moles of ammonia, there would be obtainable in accordance with the practices of this invention, i.e. the incorporation and special operation of the selective oxidation in an ammonia synthesis plant, a total additional production of 4 moles of ammonia for every mole of carbon oxide removed by selective oxidation. Translated into other terms, there would be a 1% increase in ammonia production for every 0.1% carbon monoxide removed by selective oxidation from the ammonia synthesis gases. All the above is graphically illustrated in FIG. 4.

Figure 4:
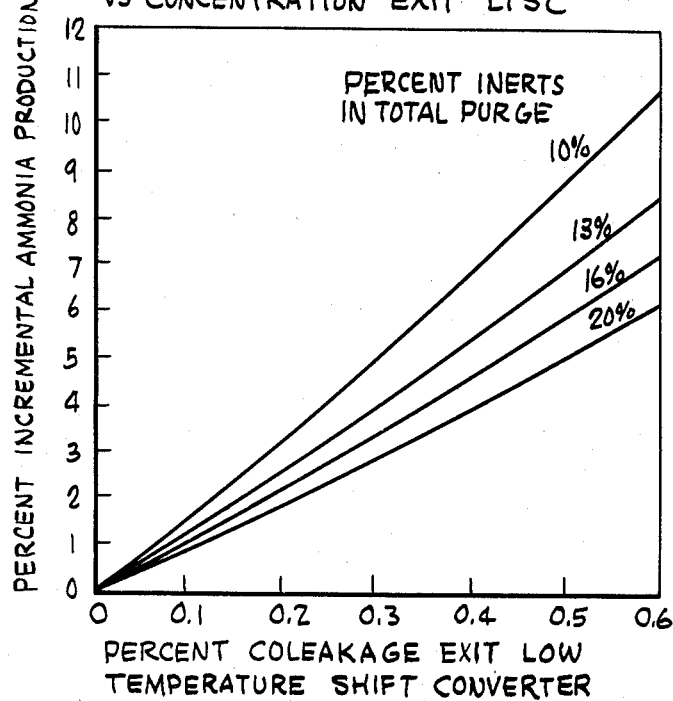
FIG. 4 is a graph showing the increase in ammonia production obtained in accordance with the practices of this invention relative to the carbon monoxide content in the gases issuing from the combination of operations involving steam reforming and plural (dual) stage shift conversion.

In connection with FIGS. 3 and 4, it was mentioned that by employing the practices of this invention in an ammonia manufacturing plant approximately a 1% increase in produced ammonia is obtainable for every 0.1% carbon monoxide removed from the synthesis gas prior to passing the synthesis gas to the methanator and the ammonia synthesis unit for synthesis loop. Provided that the $CO_2$ scrubbing process could be carried out with increased effectiveness, then removal of all the carbon monoxide by selective oxidation could allow the methanator to be eliminated with still all the attendant benefits of the practices of this invention being achieved. In this connection, reference is now made to FIG. 4 which graphically shows the increase in ammonia production upon removal of carbon monoxide by selective oxidation in accordance with this invention against carbon monoxide in the synthesis gas, such as the synthesis gas exiting the low temperature shift converter. As indicated in FIG. 4 for an average CO leakage during or across the life of the low temperature shift catalyst of about 0.27 mole % and at a typical purge gas inert concentration of 16% by volume, the incremental increase in ammonia yield by following the practices of this invention is 3% which amounts to 30 tons per day for a 1000 ton per day ammonia plant.

FIG. 5 graphically illustrates typical exotherms observed in the selective oxidation of carbon monoxide in an ammonia synthesis gas at two inlet carbon monoxide concentrations.

FIG. 6 graphically presents data showing carbon monoxide conversion with time showing that substantially 90% carbon monoxide conversion to carbon dioxide is achieved in the selective oxidation unit over an extended period of time, particularly when the carbon monoxide feed has an $O_2/CO$ molar ratio in the range from about 0.45 to about 0.65 such that the optimization of the method of air addition is made possible.

The embodiment of the practices of this invention, i.e. a process for the selective oxidation of carbon monoxide in gas streams containing high hydrogen concentrations, is particularly useful and desirable, for the reasons indicated hereinabove, for the removal of carbon monoxide from ammonia synthesis gases, particularly in ammonia manufacturing plants already have an installed methanator and in ammonia plants to be erected and which may or may not include a methanator. By careful control and selective oxidation of the carbon monoxide in an ammonia synthesis gas stream wherein practically all the carbon monoxide therein is selectively oxidized to carbon dioxide, including provisions for a better carbon dioxide absorber, ammonia manufacturing plants to be erected and producing an ammonia synthesis gas by steam catalytic reforming and catalytic shift conversion of a normally gaseous hydrocarbon, need not require a methanator.

In the practices of this invention with respect to an ammonia manufacturing plant, the oxygen for the selective oxidation of carbon monoxide can be supplied by air from the air compressor. Oxygen requirements for the selective oxidation of carbon monoxide are close to stoichiometric. The resulting treated effluent stream from the selective oxidation unit contains essentially negligible unreacted oxygen since any excess oxygen not reacted with the carbon dioxide formed in the selective oxidation operation is readily removed by processes commonly employed in ammonia manufacturing plants for the removal of carbon dioxide from an ammonia synthesis gas stream.

As indicated hereinabove, the practices of the subject invention are ideally implemented or embodied in existing ammonia manufacturing plants for installation therein directly upstream from the carbon dioxide absorber. Depending upon the type of carbon dioxide removal system or carbon dioxide absorber, the unit for the catalytic selective oxidation of carbon monoxide could receive an ammonia synthesis gas feed stream having a temperature in the range 20°–200° C., such as a temperature in the range 31°–135° C. The carbon monoxide-containing ammonia synthesis gas, as indicated hereinabove, see particularly FIG. 2, would be conditioned by heat exchange with a cooling medium, and condensibles, such as water vapor, removed. Air is then added and the carbon monoxide is selectively oxidized usually in a fixed bed catalytic reactor.

In the operation of the catalytic reactor for the selective oxidation of carbon monoxide to carbon dioxide the temperature exotherm is about 10° C. for each 0.1% CO in the feed. Depending upon the amount of carbon monoxide removal desired, and the operation of the carbon dioxide absorber, see FIG. 1, an after-cooler may be needed to slightly decrease the reactor effluent gas temperature before the effluent goes to the $CO_2$ absorber. Operations with satisfactory results have been carried out over a range of inlet CO concentrations of from 0.1 to 1 mole percent. It is preferred, however, to employ an inlet carbon monoxide concentration range suitable for an existing ammonia plant, such as about 0.2–0.5% carbon monoxide.

Valves could conveniently be installed in an existing ammonia manufacturing plant, especially during scheduled maintenance and shutdown, thus readily permitting the installation of an embodiment of the practices of this invention. Suitable valving additionally would permit bypassing the selective oxidation unit when the ammonia synthesis gas is contaminated with sulfur or halogens, normally considered catalyst poisons, such as during start-up when employing fresh high temperature shift catalyst. In actual practice and in normal operation and low temperature shift reactor located upstream of the selective oxidation unit acts as an excellent guard chamber for such impurities.

The advantages of the practices of this invention obtainable in ammonia manufacturing plants can be viewed, as indicated hereinabove, in several ways. For example, with respect to incremental increase in ammonia production the practices of this invention provide an attractive procedure by improving plant yield due to (1) reduction of purge gas flow which makes more synthesis gas available to make ammonia, in this aspect by essentially eliminating carbon monoxide from the methanator feed not only is less methane made so that less synthesis gas need be purged from the ammonia synthesis loop; (2) hydrogen in the ammonia synthesis gas is not wasted by methanation of the carbon monoxide to methane. The thus-saved hydrogen is available to make more incremental ammonia. As indicated in FIGS. 3 and 4, these advantages of the practice of this invention result in a production increase of about 4 moles of $NH_3$ per mole of CO selectively oxidized or about 1% ammonia yield gain for each 0.1% CO selectively oxidized by the means disclosed herein. Moreover, feedstock saving for the production of ammonia synthesis gas and ammonia is also realizable. Stated differently, the overall improvements in chemical efficiency achievable by the practices of this invention can be taken as a lower process feedstock requirement, e.g. natural gas or methane, per ton of ammonia production if the ammonia production is kept eqaual to that of the base plant.

The practices of this invention embodied in an ammonia manufacturing plant also permit smoother plant operation by removing fluctuations in production rate caused by low temperature shift catalyst deactivation, thereby permitting smoother operation at a high production level. Moreover, the flexibility of oeverall plant operations is enhanced. For example, the ability to operate smoothly with high end of cycle CO leakages from the low temperature shift converter allows flexibility in scheduling low temperature shift catalyst change-out or regeneration.

The safety requirements of the selective oxidation unit are conventional or typical of those taken care of by standard engineering design and operating practices. Indeed, the selective oxidation unit has inherent safety features. For example, in the operation of the selective oxidation of carbon monoxide, there is employed oxygen concentrations in the total gas stream undergoing processing of less than 0.4%, concentrations which are well below the lower flammability limits (e.g. 5.9% at atmospheric pressure). Moreover, the temperatures employed in the selective oxidation unit, as indicated hereinabove, are moderate, particularly as compared to the temperatures of the other units of the ammonia plant. Additional safety precautions might be taken in the operation of the selective oxidation unit, if desired. For example, it would appear that the only location which would have a composition within the flammability limits is where air is being mixed into the synthesis gas stream. At that location one could employ an air feed device for immediate mixing with the ammonia synthesis gas so that nozzle velocities greatly exceed flame propagation speed. A mechanical shut-off in the air stream, similar to that conventionally employed in the secondary reformer air system and which is activated and alarmed by certain key process measurements, such as high/low process gas flow rate, high/low air flow rate, high reactor exit temperature and low system pressure, may be employed in connection with the operation of the selective oxidation unit. The air control valve and mechanical shut-off valve would form an automatic block and safety system vent on the air line when activated. Such valves would be designed to be failsafe and a safety shut-down of air from the secondary reformer could be provided to activate the mechanical shut-off for the air to the selective oxidation unit. In addition to the above, there would be provided active automatic alarms responsive to several process variables of the selective oxidation unit including temperature, pressure and concentrations of carbon monoxide and oxygen.

It is apparent from the foregoing description that the use of a carbon monoxide selective oxidation unit in an ammonia manufacturing plant provides for combining many of the best features of yield-improving processes available for the manufacture of ammonia. The following summarizes the advantages of the selective oxidation of carbon monoxide compared to improvements in low temperature shift technology and to hydrogen recovery from purge gas systems.

With respect to the advantages of selective oxidation of carbon monoxide over improved LTS systems, water gas shift catalyst capability sets the lower limit of CO concentration which can be economically achieved in an ammonia plant operation while the addition of a selective oxidation unit allows this limitation to be overcome. Although 1 mole of hydrogen can be, in principle, produced by shifting 1 mole of CO this opportunity no longer exists when the shift catalyst has limited activity. The selective oxidation process more than offsets this loss by achieving lower final CO levels and saving hydrogen consumption in the methanator. For example, selective oxidation of carbon monoxide from 0.17% to 0.14% saves as much hydrogen in the methanator as is made by shift technology in going from 0.25% to 0.17%. FIG. 6 of the drawings shows that 90% conversion of carbon monoxide to carbon dioxide is feasible, thereby making carbon monoxide effluent concentrations in the range 0.03-0.02% and lower, practical. Concentrations this low have never been obtained routinely in base ammonia plants.

With respect to the advantages of the practices of this invention, i.e. incorporating a selective oxidation unit in an ammonia plant, over hydrogen recovery from purge gas, it should be kept in mind that hydrogen recovery from the purge gas does not prevent hydrogen consumption in the methanator. Moreover, selective oxidation of carbon monoxide improves the basic efficiency of the ammonia plant by dealing directly with the source of the problem, i.e. reducing the need to purge by reducing inerts entering the ammonia synthesis loop. This is preferred over recovering hydrogen from the purge gas. It should also be kept in mind that systems for hydrogen recovery from purge gas are expensive, particularly as compared with a low temperature catalytic reactor for the selective oxidation of carbon monoxide to carbon dioxide. Finally, although hydrogen recovery and recycle to the ammonia plant could reduce feedstock requirements, as would the injection of pure hydrogen into the ammonia plant, converting this recovered hydrogen into incremental ammonia results in strong interactions with the rest of the ammonia plant. Relative to selective oxidation of carbon monoxide, larger amounts of new air from the air compressor are needed to produce incremental ammonia. This puts an increased strain on the air compressor as well as on the ammonia synthesis loop compressor. The benefits of the practices of this invention come from reduced purging requirements. Moreover, the increased hydrogen and nitrogen entering and being recycled in the synthesis loop are therefore already in the proper ratio to be converted into ammonia. The practices of this invention when employed in an ammonia manufacturing plant are capable of increasing yields from 3 to 5% as shown on FIG. 4.

The practices of this invention are described in various embodiments and in greater detail hereinafter, particularly in accompanying FIG. 7.

Reference is now made to FIG. 7 of the drawings wherein there is illustrated one embodiment of the practices of this invention, i.e. the incorporation of selective oxidation of carbon monoxide in the ammonia synthesis gas stream in an ammonia plant and wherein the oxygen employed for the selective oxidation of carbon monoxide is derived from a mixture of diverted and new air.

Ideally, each mole of carbon monoxide removed from the ammonia synthesis gas by selective oxidation saves 3 moles of hydrogen that would have been consumed during methanation. Each mole of carbon monoxide removed also theoretically requires one-half mole of oxygen. Assuming air contains 1 mole of oxygen and 4 moles of nitrogen and since ammonia synthesis requires 1 mole of nitrogen for each 3 moles of hydrogen, it can be seen that embodying the practices of this invention in an ammonia plant employing some new air for the operation of the selective oxidation unit makes available some excess nitrogen depending on the percentage of new air to the Selectoxo unit. This situation is illustrated in the following equations:

$$CO + \tfrac{1}{2}O_2 + 2N_2^{(new)} \rightarrow CO_2 + 2N_2^{(new)} \quad (1)$$
$$CO + 3H_2 \rightarrow CH_4 \quad (2)$$
$$N_2 + 3H_2^{(exists)} \rightarrow 2NH_3 \quad (3)$$

Assuming equations (2) and (3) apply for the base equivalent ammonia plant which is in balance, when one switches to equations (1) and (3) for a plant which embodies a selective oxidation unit in accordance with the selective oxidation of this invention, it is seen that $3H_2$ in equation (2) are not used.

For each mole of carbon monoxide removed by selective oxidation caused by the new air, there would be available 1 extra net mole of nitrogen from equations (1) and (3). Applying this to the base equivalent ammonia plant, i.e. the specific ammonia plant without a unit for the selective oxidation of carbon monoxide in the ammonia plant, there would be a change in the hydrogen/nitrogen ratio going to the ammonia synthesis loop from about 3.0 to some lower value. It is known that ammonia synthesis converter yield is sensitive to H/N ratio and that ratios below 3.0, such as in the range 2.3–2.8, are more favorable, see for example, accompanying FIG. 8 of the drawings and Chemical Process Monograph No. 26, entitled "Ammonia & Synthesis Gas" by R. Noyes (1967) and the article by H. Uchida and M. Kuraishi in Bull. Chem. Soc., Japan, 106, (1955). The disclosures of these publications are herein incorporated and made part of this disclosure. A standard ammonia plant is balanced for maximum heat and mass efficiency and does not operate as close to the peak of FIG. 8 as one would desire strictly from an optimization for the overall single train plant heat plus material balance. The only additional source of nitrogen in a standard plant is via air to the secondary reformer. Additional increases in this air rate will result in high temperatures and lower equipment life in the secondary reformer and also more hydrogen consumption in the secondary reformer. The hydrogen loss would negate the value of the increased nitrogen.

The implementation of a selective oxidation unit in an ammonia plant, as illustrated in FIG. 7, whereby a mixture of diverted air and a separate source of air (nitrogen) is now useable and available (oxygen removed from the air by the operation of the carbon monoxide selective oxidation unit) removes this constraint. This permits the ammonia synthesis converter or reactor to be less coupled with the front end of the plant, i.e. the reformers and shift converters, and therefore separately optimized to give a greater yield of ammonia as illustrated in accompanying Table I calculated for one specific base ammonia plant referred to as Base Plant A. Other base plants could be selected and selective oxidation would result in benefits of a different amount for each specific plant.

TABLE I

EFFECT OF AIR SOURCE FOR SELECTIVE OXIDATION OF CO (SELECTIVE OXIDATION AIR) ON AMMONIA PLANT OPERATION

|  | Base Plant A | Selective Oxidation Part* New Air |
|---|---|---|
| H/N Molar Ratio | 3.0 | 3.0 |
| NH₃ Yield, Ton/Day | 1000 | 1042.5 |

*Part new air calculation assumes ½ O₂ is supplied as diverted air from the secondary reformer and the other half as new air.

A standard and specific base ammonia plant (called base plant B in Table II and different than the plant in Table I) operating with about 0.3 mole percent CO leakage at the exit of the low temperature shift converter can be improved by the addition of a selective oxidation unit, such as illustrated in FIG. 7. New air is not added and the total air to the ammonia plant is maintained constant. The percent air diverted to the selective oxidation unit can be optimized for maximum overall ammonia yield gain by changing conditions in the secondary reformer, the primary reformer and the ammonia synthesis loop. Interactions are unique and not a direct function of carbon monoxide conversion as indicated in accompanying Table II.

TABLE II

EFFECT OF SUPPLYING OXYGEN TO CO SELECTIVE OXIDATION UNIT (SELECTIVE OXIDATION TECHNOLOGY) BY DIVERSION OF SECONDARY REFORMER AIR ON THE PERFORMANCE OF BASE AMMONIA PLANT B

Key: 0.14% CH₄ exit secondary reformer
0.31% CO exit low temperature shift converter (LTSC)

| % Air Diverted To Oxidation of Carbon Monoxide | % CO Converted | % NH₃ Yield Gain Over Base Plant | % CO Exit LTSC | % CH₄ Exit Secondary Reformer | H/N Feed to Syn Loop |
|---|---|---|---|---|---|
| 0 | 0 | 0 | .312 | .137 | 2.891 |
| 1 | 35.2 | 1.42 | .317 | .148 | 2.910 |
| 2 | 69.6 | 3.17 | .321 | .158 | 2.929 |
| 3 | 100 | 4.72 | .326 | .169 | 2.946 |
| 4 | 100 | 4.52 | .330 | .182 | 2.944 |
| 5 | 100 | 4.26 | .335 | .195 | 2.941 |
| 6 | 100 | 4.02 | .339 | .210 | 2.938 |

It would not be expected that one could supply all the oxygen needed for CO oxidation from the same total air utilized in a base equivalent ammonia plant in employing selective oxidation of carbon monoxide in a synthesis gas and still maintain an overall heat and material balance at good efficiency levels in the modified and improved plant. The apparent optimum in NH₃ yield is uniquely related to the carbon monoxide and hydrogen effluent from the secondary reformer and low temperature shift converter and the H/N ratio in the ammonia synthesis loop as it must change to satisfy the NH₃ reaction stoichiometry and to meet purge requirements for removal of inerts from the ammonia synthesis loop.

How the advantages of the practices of this invention are achieved in an ammonia synthesis plant have been indicated and described hereinabove with reference to FIG. 7 and the operation of an ammonia synthesis plant illustrated in FIG. 7 would readily understood by those skilled in the art. Accordingly, the description with respect to the operation of the ammonia synthesis plant embodying a selective oxidation unit in accordance with this invention and illustrated in FIG. 7 is described nominally.

High temperature, high pressure steam from a suitable source, not illustrated, is supplied via line 40 to primary reformer 41 for reaction with a suitable hydrocarbon feedstock derived from a source, not shown, and supplied to primary reformer 41 via line 42 for reaction with the steam in the presence of a suitable reforming catalyst, such as a promoted nickel oxide catalyst maintained within reactor 44 of primary reformer 41. In the operation of primary reformer 41 for the production of an ammonia synthesis gas a normally gaseous hydrocarbon, such as methane or natural gas or a vaporized light petroleum fraction, such as light naphtha, is preferred.

After catalytic reforming within primary reformer 41 the resulting gaseous reaction admixture is supplied via line 45 to secondary reformer 46 wherein it is brought into contact with air supplied from a suitable source, not shown, via line 48 through primary reformer 41 for indirect heat exchange contact therein a line 49. Within secondary reformer 46 the reaction of the hydrocarbon feed with steam and air is further completed as in accordance with the chemical reactions:

$$CH_4 + H_2O \rightarrow CO + 3H_2$$

$$CO + H_2O \rightarrow CO_2 + H_2$$

$$CH_4 + 2O_2 \rightarrow CO_2 + 2H_2O$$

$$CO + \tfrac{1}{2}O_2 \rightarrow CO_2$$

$$H_2 + \tfrac{1}{2}O_2 \rightarrow H_2O$$

Air supplied to secondary reformer 46 utilizing a less active but higher temperature stability catalyst than the primary reformer, after preheating in primary reformer 41 via line 49 serves to balance the energy in primary reformer 41 and secondary reformer 46 and at the same time serves to supply the nitrogen component to the hot product gases issuing from secondary reformer 46 via line 50. These hot gases are desirably cooled by flowing through heat exchanger 51 for indirect heat exchange contact with boiler feed water supplied to heat exchanger 51 via line 52 for the production of steam which is removed from heat exchanger 51 via line 54. The resulting, now somewhat cooled, reformer gases are supplied via line 55 to high temperature shift converter 56 (with optional provision for adding more steam) wherein the gases are subjected to contact with a suitable catalyst, such as K₂O promoted iron oxide catalyst, for the conversion of the carbon monoxide in the gases entering high temperature shift converter 56 to carbon dioxide and hydrogen. The resulting hot gases leaving high temperature shift converter 56 via line 58 are cooled within heat exchanger 59 by indirect heat exchange contact with boiler feed water supplied to heat exchanger 59 via line 60 for the production of steam which exits heat exchanger 59 via line 63. The resulting cooled gases are then supplied via line 61 to low temperature shift converter 62 (with optional provision for adding more steam) which, as indicated, is operated at a lower temperature relative to high temperature shift converter 56. Low temperature shift converter 62 is provided with an active catalyst, such as a catalytic admixture of copper oxide (CuO) and zinc oxide (ZnO) effective to carry out the reaction to the extent that activity of the catalyst and equilibrium will permit.

$$CO + H_2O \rightleftharpoons H_2CO_2$$

The resulting gases leaving low temperature shift converter 62 via line 64 are passed, if desired, through heat exchanger 65 into indirect heat exchange contact therein with boiler feed water supplied via line 66 for the production of steam which is removed from heat exchanger 65 via line 68. Upon leaving heat exchanger 65 via line 69 additional cooling of the shift gases may be effected by cooling heat exchanger 70 and resulting cooled gases supplied via line 71 to knockout drum 72 wherein water vapor and other condensibles or solubles such as ammonia, chlorine, and CO₂ in the shift gases are removed as condensed water, via line 73. The resulting shift gases leave knockout drum 72 via line 74.

The gases in line 74 are comprised essentially of nitrogen and hydrogen in approximate stoichiometric ratio for the manufacture of ammonia and appreciable CO₂ together with minor amounts of other gases including carbon monoxide, ammonia, HCl and H₂S and are substantially saturated with water vapor at the temperature of the drum 72. However, and in accordance with the embodiment of the practices of this invention illustrated in FIG. 7, additional oxygen from newly supplied air is added to the shift gases in an amount sufficient to effect substantially complete oxidation of the carbon monoxide exiting the shift reactor which will then enter the selective oxidation reactor 86.

As illustrated, the shift gases flowing in line 74 are supplied via line 75, valve 76 in line 78 being closed, to cooling heat exchanger 79 and then to knockout drum 80 for the removal of additional condensibles therefrom, usually water, which leaves knockout drum 80 via line 81. The resulting gases leaving knockout drum 80 via line 82 may be reheated to a suitable temperature, such as in the range 20°–120° C., more or less, upon passage through heat exchanger 84 and the resulting superheated gases supplied via line 85 to selective oxidation unit 86. Before these gases enter selective oxidation unit 86, air from a suitable source is supplied via line 88 for admixture therewith. The resulting admixed gases comprising essentially nitrogen and hydrogen, carbon monoxide and carbon dioxide and oxygen in an amount sufficient for the selective oxidation of carbon monoxide to carbon dioxide come into contact with a catalyst within selective oxidation unit 86, usually a fixed mass of catalyst, effective for the selective oxidation of carbon monoxide to carbon dioxide even in the presence of a significant concentration of hydrogen, such as at least about 50% hydrogen in the gas and usually about 60%.

In the operation of unit 86 a selective oxidation catalyst is employed. The resulting catalytically treated gases, now having a substantially reduced carbon monoxide content and an increased carbon dioxide content, leave selective oxidation unit 86 via line 87 and are supplied to carbon dioxide absorber 89. The gases entering carbon dioxide absorber 89 would have a substantial carbon dioxide content, such as about 20% carbon dioxide, more or less. Within absorber 89 the gases would be contacted with a suitable solution effective for the extraction of carbon dioxide, the solution lean with respect to $CO_2$ being supplied to the upper portion of absorber 89 via line 90 and recovered rich with respect to $CO_2$ from the bottom of absorber 89 via line 91. The solution leaving the bottom of absorber 89 via line 91, now enriched with respect to carbon dioxide, passed through heat exchanger 92 and then line 94 to drum 95 from which the absorbed carbon dioxide is released and vented via line 96. The solution now lean with respect to carbon dioxide is recovered via line 98 and after passing through heat exchanger 92 is supplied via line 90 to carbon dioxide absorber 89 for the removal of more carbon dioxide.

The gases leaving carbon dioxide absorber 89 via line 99 would now have a substantially reduced carbon dioxide content, e.g. about 0.1%. These gases are then supplied to methanator 100 into contact with a suitable methanation catalyst, such as a nickel oxide catalyst similar to the reformer catalyst employed in catalytic reformers 41 and 46, for the conversion of the carbon oxides, particularly carbon monoxide and carbon dioxide, to methane (under conditions favorable to methanation, the reverse reaction to steam reforming). The resulting converted gases, now having a substantially reduced carbon oxides content, e.g. carbon monoxide plus carbon dioxide content less than about 10–20 ppm, leave methanator 100 via line 101 to heat exchanger 102 wherein its temperature is reduced by indirect heat exchange with boiler feed water supplied to heat exchanger 102 via line 103 and leaving as steam via line 107. The gases leave heat exchanger 102 via line 104 to the ammonia synthesis converter or loop 105 wherein the gases, now comprising essentially about 3 moles of hydrogen to 1 mole of nitrogen, are reacted at an elevated pressure, such as in the range 2000–10,000 psig, and at an elevated temperature, such as about 450° C. and in the presence of a suitable catalyst, such as a promoted iron catalyst, for the conversion of the nitrogen and hydrogen to ammonia. The product ammonia is recovered from the ammonia synthesis loop 105 via line 106 and inerts containing a substantial amount of methane, argon and other inerts along with synthesis gas are removed specifically via purge line 108.

The arrangement shown in FIG. 7 also allows for part of the air to the selective oxidation unit to be new air and part diverted air simply by increasing the total (stream 48 plus 88) air flow to the plant enough to provide some new air but not enough to make the flow rate of stream 48 equal to the value it had in the base plant before addition of the selective oxidation unit.

Another advantage not mentioned heretofore in connection with the practices of this invention involves the increase in ammonia synthesis catalyst life. Accompanying Table III shows the effect of varying the purge flow rate when the practices of this invention are employed in an ammonia synthesis plant. As indicated in accompanying Table III, when the purge flow of an ammonia synthesis plant employing the selective oxidation process is made equal to that of a base ammonia synthesis plant which does not employ the practices of this invention, then the following results are noted:

(1) decreased percentage inerts (increased synthesis catalyst life);
(2) increased quality purge gas (higher percent $H_2$) while still maintaining a slight improvement in ammonia yield.

These advantages offset the lower incremental yield of ammonia by allowing a savings in synthesis catalyst purchase or by maintaining a higher plant stream factor and providing production more continuously.

TABLE III

EFFECTS OF VARYING PURGE RATE IN AN AMMONIA PLANT WHICH INCORPORATES A UNIT FOR THE SELECTIVE OXIDATION OF CARBON MONOXIDE (SELECTIVE OXIDATION TECHNOLOGY)

|  |  | Base Plant C | Selective Oxidation of Carbon Monoxide | | | | | |
| --- | --- | --- | --- | --- | --- | --- | --- | --- |
| % inerts in purge | | 15.0 | 15.0 | 14.0 | 13.0 | 12.0 | 11.0 | 10.0 |
| product $NH_3$, T/D | | 1000 | 1037.3 | 1032.9 | 1028.2 | 1022.7 | 1016.3 | 1008.2 |
| purge gas, mol/hr. | | 797.5 | 561.4 | 601.4 | 647.6 | 701.7 | 765.5 | 841.9 |
| purge composition: | | | | | | | | |
| $N_2$ | | 21.25 | 21.25 | 21.50 | 21.75 | 22.00 | 22.25 | 22.50 |
| $H_2$ | | 63.75 | 63.75 | 64.50 | 65.25 | 66.00 | 66.75 | 67.50 |
| $CH_4$ | mol % | 11.06 | 9.31 | 8.69 | 8.07 | 7.45 | 6.83 | 6.21 |
| Ar | | 3.94 | 5.69 | 5.31 | 4.93 | 4.55 | 4.17 | 3.79 |

Further, the practices of this invention result in improving the overall thermal efficiency of each incremental ton of ammonia produced. The data set forth in accompanying Table IV, however, show unexpectedly that the incremental energy per ton of ammonia produced is actually less (22.2 and 23.5 mm BTU/ton vs. 30–35 mm BTU/ton typically obtained in prior art plants) when such a change is made in an ammonia plant embodying the practices of this invention, the selective oxidation of the carbon monoxide in the ammonia synthesis gas prior to passing the ammonia synthesis gas to the ammonia synthesis converter. With or without embodying the practices of this invention in an ammonia synthesis plant, the primary reformer temperature of the base ammonia plant could be increased and an increase in ammonia yield would result. The overall thermal efficiency of such a change based on a standard design or operation would not, however, change significantly and selective oxidation helps in either case.

TABLE IV

PROJECTED CHANGES IN OVERALL THERMAL PLUS CHEMICAL EFFICIENCY FOR AMMONIA PLANT WITH SELECTIVE CO OXIDATION UNIT AT AVERAGE BASE CONDITIONS

|  | Base* Plant D | Selective CO Oxidation Modes | |
| --- | --- | --- | --- |
|  |  | Primary Reformer Temp. Increase | Primary Reformer Temp. Constant |
| Primary Reformer Temp., °F. | — | +2 to 4° F. | — |

TABLE IV-continued
PROJECTED CHANGES IN OVERALL THERMAL PLUS CHEMICAL EFFICIENCY FOR AMMONIA PLANT WITH SELECTIVE CO OXIDATION UNIT AT AVERAGE BASE CONDITIONS

| | | Selective CO Oxidation Modes | |
|---|---|---|---|
| | Base* Plant D | Primary Reformer Temp. Increase | Primary Reformer Temp. Constant |
| % CH$_4$ Exit Secondary Reformer | 0.4 | 0.4 | 0.447 |
| Ammonia Yield Increase Ton/Day | — | 24.2 | 20.6 |
| Incremental Energy Required, MM BTU/hr. | | | |
| Reduced Purge Gas | — | +18.0 | +15.4 |
| Increased Primary Reformer Temperature to Compensate for Air Diversion from Secondary Reformer | — | +1.2 | — |
| Synthesis Loop Compressor to counter ΔP and Higher Synthesis Gas Rate | — | +2.2 | +2.0 |
| Loss of Methanator Heat of Reaction | — | +2.6 | +2.6 |
| Lower Heat Recovery Exit Secondary Reformer due to Air Diversion | — | +1.1 | +2.5 |
| Total Increase | | 25.1 | 22.5 |
| Extra Energy Released in NH$_3$ Heat of Reaction, MM BTU/hr. | — | −2.7 | −2.3 |
| Net Energy Increase, MM BTU/hr. | — | 22.4 | 20.2 |
| Overall Thermal Plus Chemical Efficiency ΔEnergy/ΔNH$_3$, MM BTU/ton | | 22.2 | 23.5 |

*The base plant D typically has a thermal efficiency of 30 to 35 mm BTU/ton NH$_3$ for a typical 1000 ton/day modern design.

Another advantage of this implementation of a selective oxidation unit is to increase the time average ammonia production over the time period in which both the low temperature shift catalyst and the synthesis catalyst are aging. Accompanying FIG. 9 illustrates the increased NH$_3$ yield as a general function of shift catalyst plus synthesis catalyst age employing the methods of air addition and high selective oxidation CO conversion previously illustrated.

In the practices of this invention the operating conditions for the selective oxidation of the carbon monoxide in the ammonia synthesis gas to carbon dioxide can be altered during operation to extend the life of the low temperature shift converter catalyst. Calculations would show that as the shift catalyst ages to exit CO levels of 0.5% and higher, the selective oxidation of carbon monoxide to carbon dioxide could be reduced without changing the effect of the selective oxidation effluent temperature on the CO$_2$ absorber. High ammonia yield and overall plant stream factor could thus be obtained in this mode of operation where the selective oxidation of carbon monoxide to carbon dioxide is as low as 50%, a range where one would not a priori expect large benefits. It is also significant that such a mode of operation would make the selective oxidation unit feed conditions sub-stoichiometric with respect to oxygen to carbon monoxide molar ratio as shown in accompanying Table V.

TABLE V
IMPACT OF CO OXIDATION ON CRITERIA FOR LOW TEMPERATURE SHIFT CONVERTER (LTSC) CATALYST REPLACEMENT

| | Base Plant E | Regular CO Oxidation | Low CO Oxidation |
|---|---|---|---|
| LTSC, % Leakage | 0.3 | 0.3 | 0.6 |
| O$_2$/CO Ratio Inlet for CO Oxidation | — | Stoichiometric | ½ Stoichiometric |
| CO Conversion | — | 100% | 50% |
| CO Inlet to Methanator | 0.3 | 0 | 0.3 |
| Absolute Ton/Day of NH$_3$ | 1000 | 1040 | greater than 1000 but less than 1040 |

In the operation of an ammonia synthesis plant embodying the practices of this invention great flexibility in the operation of the selective oxidation unit for the conversion of carbon monoxide to carbon dioxide is possible and great flexibility and compatibility of this selective oxidation operation with respect to other operations of the ammonia plant and in the overall plant are available. For example, the operating temperature of the selective oxidation unit could be substantially any suitable temperature, such as a temperature in the range 20°–200° C., compatible with the synthesis gas feed to be treated coming from the low temperature shift converter after some temperature reduction and/or with the operation of the carbon dioxide absorption unit. Not only is the temperature of operation of the selective oxidation unit variable for flexibility and compatibility in the overall plant operation but also the pressure employed in the selective oxidation unit. The selective oxidation unit can be employed at substantially any suitable pressure depending upon the pressure of the synthesis gas issuing from the low temperature shift converter and/or the pressure of the selective oxidation gaseous effluent being supplied to the carbon dioxide absorber. Accordingly, the carbon monoxide selective oxidation unit can be operated at substantially any suitable pressure from above ambient atmospheric pressure to a relatively high pressure, e.g. up to about 500 psig, more or less, depending to some extent on the operational requirements of the main ammonia plant.

Also, as indicated hereinabove, the amount of carbon monoxide oxidation to carbon dioxide in the carbon monoxide selective oxidation unit can be varied. Theoretically, practically 100% selective oxidation of the carbon monoxide in the synthesis gas can be accomplished with the result that there would be substantially no carbon monoxide, e.g. less than 10–20 ppm CO, in the synthesis gas feed going to the methanator, thereby substantially eliminating the requirement for the methanator, if CO$_2$ absorption technology can be improved such that the CO$_2$ level exit the absorber is as low as the CO level exit the selective oxidation unit. In any case, the level of carbon monoxide in the synthesis gas could be decreased by the operation of the carbon monoxide selective oxidation unit such that less than about 300–400 ppm carbon monoxide would appear in the feed to the methanator which would then effect a further reduction of the carbon monoxide in the synthesis gas being fed to the ammonia synthesis converter. By reducing the carbon monoxide in the feed gas going to the methanator, the intensity or severity of operation of the methanator for substantial eliminating of carbon monoxide by its conversion to methane could be lowered.

In some instances the carbon monoxide selective oxidation unit might only be used to oxidize an amount such as 50-80% of the carbon monoxide in the feed to the selective oxidation unit. As indicated, the operation of the carbon monoxide selective oxidation unit permits flexibility in the operation of and capability with other units of the ammonia synthesis plant both upstream and downstream relative to the carbon monoxide selective oxidation unit.

As will be apparent to those skilled in the art in the light of the foregoing disclosure, many alterations, substitutions and modifications are possible in the practices of this invention without departing from the spirit or scope thereof. The numerous benefits and variation are much more than one would expect from substitution of a selective oxidation reaction for methanation, which is easily seen to give a chemical efficiency give via the saving of $H_2$ that is consumed automatically by the stoichiometry of the methanation reaction.

What is claimed is:

1. In a process for the catalytic synthesis of ammonia from a synthesis gas comprising nitrogen and hydrogen wherein said synthesis gas is produced by steam reforming a normally gaseous hydrocarbon or vaporized naphtha in a steam reforming reaction zone into which air is introduced at a preselected rate and the resulting reforming reaction zone effluent is shift converted to produce a gaseous mixture containing, in addition to hydrogen and nitrogen in approximately stoichiometric proportion for the production of ammonia, residual carbon monoxide, said gaseous mixture being at an elevated temperature substantially above 200° C. and wherein said gaseous mixture is cooled to a temperature in the range from about 20° C. to about 200° C. to condense water vapor therefrom and the resulting condensed water vapor removed from the resulting cooled gaseous mixture followed by introducing the cooled gaseous mixture into a selective oxidation reaction zone containing a catalyst effective for the selective oxidation of carbon monoxide to carbon dioxide in the presence of hydrogen and wherein there is withdrawn from the selective oxidation reaction zone the resulting treated gaseous mixture now having a reduced carbon monoxide content and comprising nitrogen, hydrogen and carbon dioxide and the resulting gaseous mixture withdrawn from said selective oxidation reaction zone treated for the selective removal of carbon dioxide therefrom and the resulting treated gaseous mixture, now having a reduced carbon monoxide and carbon dioxide content and consisting essentially of nitrogen and hydrogen, introduced into an ammonia conversion zone to contact therein a catalyst effective for the conversion of said nitrogen and hydrogen to ammonia, the improvement which comprises diverting a minor proportion of said air into said selective oxidation reaction zone, thereby reducing the rate of air introduced into said steam reforming zone to less than said preselected rate and introducing supplemental oxygen into said selective oxidation reaction zone, said diverted air and said supplemental oxygen thus-introduced into said selective oxidation zone serving to oxidize the carbon monoxide introduced thereinto as part of said cooled gaseous mixture to carbon dioxide, upon contact with said selective oxidation catalyst.

2. The process of claim 1 wherein said diverted air provides from about 40-60% of the oxygen introduced into said selective oxidation reaction zone, said supplemental oxygen provides from about 60-40% of the oxygen introduced into said selective oxidation zone and said diverted air and supplemental oxygen together provide at least about 50% of the stoichiometric amount of oxygen required to oxidize said carbon monoxide to carbon dioxide in said selective oxidation reaction zone.

3. The process of claim 2 wherein said diverted air and supplemental oxygen together provide approximately the stoichiometric amount of oxygen required to oxidize all of said carbon monoxide to carbon dioxide in said selective oxidation zone.

4. The process of claim 3 where at least about 50% of the stoichiometric amount of oxygen required to oxidize all said carbon monoxide to carbon dioxide in said selective oxidation reaction zone is provided by said supplemental oxygen and the balance is provided by said diverted air.

5. The process of claim 3 where at least about 50% of the stoichiometric amount of oxygen required to oxidize all said carbon monoxide to carbon dioxide in said selective oxidation reaction zone is provided by said diverted air and the balance is provided by said supplemental oxygen.

6. The process of claim 1 wherein said supplemental oxygen is provided by introducing an air stream into said selective oxidation reaction zone.

7. The process of claim 6 wherein said air introduced into said steam reforming reaction zone and said air stream are provided from a common source.

8. The method of claim 1 wherein said selective oxidation catalyst is a platinum metal containing catalyst.

9. The process of claim 8 wherein said treated gaseous mixture passed into said ammonia conversion zone contains less than about 10 ppm carbon oxides.

10. The process of claim 1 further including the step of passing said resulting treated gaseous mixture to a methanation zone prior to said passing of the treated gaseous mixture to said ammonia conversion zone, and in said methanation zone converting residual carbon monoxide and carbon dioxide to methane.

11. The process of claim 1 wherein said ammonia conversion zone is maintained at an elevated pressure in the range of 2000-10,000 psi and at an elevated temperature in the range of 350°-550° C.

12. The process of claim 1 wherein the sum of diverted air and supplemental oxygen introduced into said selective oxidation reaction zone is such as to provide at least the stoichiometric amount of oxygen required to convert all said carbon monoxide in said selective oxidation reaction zone to carbon dioxide.

13. The process of claim 1 wherein said selective oxidation catalyst is a platinum metal containing catalyst.

14. The process of claim 1 wherein said catalyst effective for the conversion of said gaseous nitrogen and hydrogen to ammonia is an iron-containing catalyst.

15. The process of claim 1 further including the step resulting of passing said treated gaseous mixture to a treatment zone prior to said passing of the treated gaseous mixture to said ammonia conversion zone and in said treatment zone treating said gaseous mixture to further reduce the carbon monoxide and carbon dioxide content thereof.

16. In a process for the catalytic synthesis of ammonia from a sythesis gas consisting essentially of hydrogen and nitrogen in the mol ratio of hydrogen to nitrogen from about 2.8:1 to 3.2:1 wherein said synthesis gas is produced by steam reforming a normally gaseous hydrocarbon or vaporized naphtha in a steam reforming reaction zone into which air is introduced at a preselected rate and the resulting reforming reaction zone effluent is shift converted to produce a gaseous mixture containing hydrogen and nitrogen at about the aforesaid hydrogen to nitrogen mol ratio, said gaseous mixture being at an elevated temperature above about 200° C. and wherein said gaseous mixture is cooled to a temperature in the range from about 20° C. to about 200° C. to condense water vapor therefrom, followed by introducing the cooled gaseous mixture into a selective oxidation reaction zone containing a platinum catalyst effective for the selective oxidation of carbon monoxide to carbon dioxide in the presence of hydrogen and wherein there is withdrawn from the selective oxidation reaction zone a resulting treated gaseous mixture, now having a reduced carbon monoxide content and comprising nitrogen, hydrogen and carbon dioxide, and the resulting gaseous mixture is further treated for the selective removal of carbon dioxide therefrom and the resulting further treated gaseous mixture, now having a reduced carbon monoxide and carbon dioxide content and consisting essentially of nitrogen and hydrogen is introduced into an ammonia conversion zone to contact therein a catalyst effective for the conversion of said nitrogen and hydrogen to ammonia, the improvement which comprises diverting a minor portion of said air into said selective oxidation reaction zone, thereby reducing the rate of air introduced into said steam reforming zone to less than said preselected rate, said air diverted to said selective oxidation zone being in an amount sufficient to provide about 40–60% of the oxygen introduced into said selective oxidation reaction zone, introducing supplemental oxygen into said selective oxidation reaction zone in an amount sufficient to provide about 60–40% of the oxygen introduced into said selective oxidation reaction zone, said diverted air and supplemental oxygen together providing from about one-half to about the full stoichiometric amount of oxygen required to oxidize all of the carbon monoxide in said selective oxidation reaction zone to carbon dioxide and serving therein to oxidize carbon monoxide to carbon dioxide, in contact with said selective oxidation catalyst.

17. The process of claim 16 further including the step of passing said resulting treated gaseous mixture to a methanation zone prior to said passing of the treated gaseous mixture to said ammonia conversion zone and in said methanation zone converting residual carbon monoxide and carbon dioxide to methane.

18. The process of claim 17 wherein said treated gaseous mixture passed into said ammonia conversion zone contains less than about 10 ppm carbon oxides.

19. The process of claim 16 wherein said supplemental oxygen is provided by introducing an air stream into said selective oxidation reaction zone.

20. The process of claim 19 wherein said air introduced into said steam reforming reaction zone and said air stream are provided from a common source.

21. The process of claim 16 further including the step of passing said resulting treated gaseous mixture to a treatment zone prior to said passing of the treated gaseous mixture to said ammonia conversion zone and in said treatment zone treating said gaseous mixture to further reduce the carbon monoxide and carbon dioxide content thereof.

* * * * *